Nov. 17, 1970 — P. M. BOUTHORS — 3,540,068
TRAFFIC SYSTEMS OF VEHICLES
Filed May 31, 1967 — 2 Sheets-Sheet 1

INVENTOR
PIERRE MARCEL BOUTHORS
BY
Stevens, Davis, Miller & Mosher
ATTORNEYS

Nov. 17, 1970      P. M. BOUTHORS      3,540,068
TRAFFIC SYSTEMS OF VEHICLES
Filed May 31, 1967      2 Sheets-Sheet 2
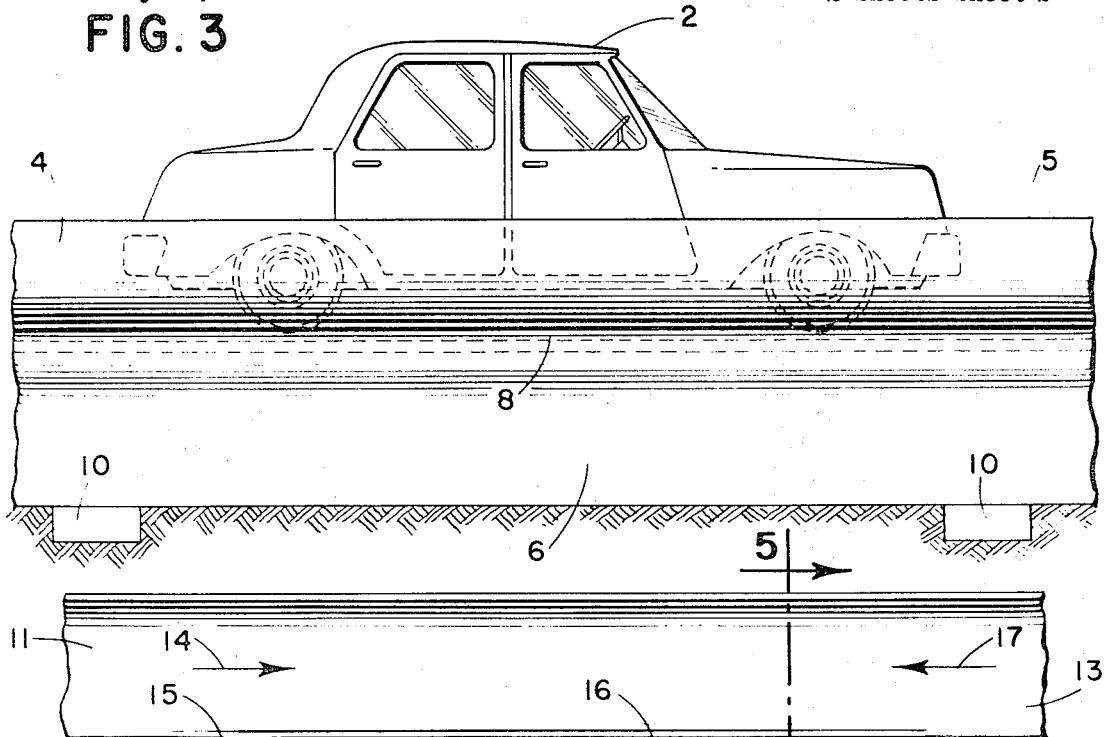
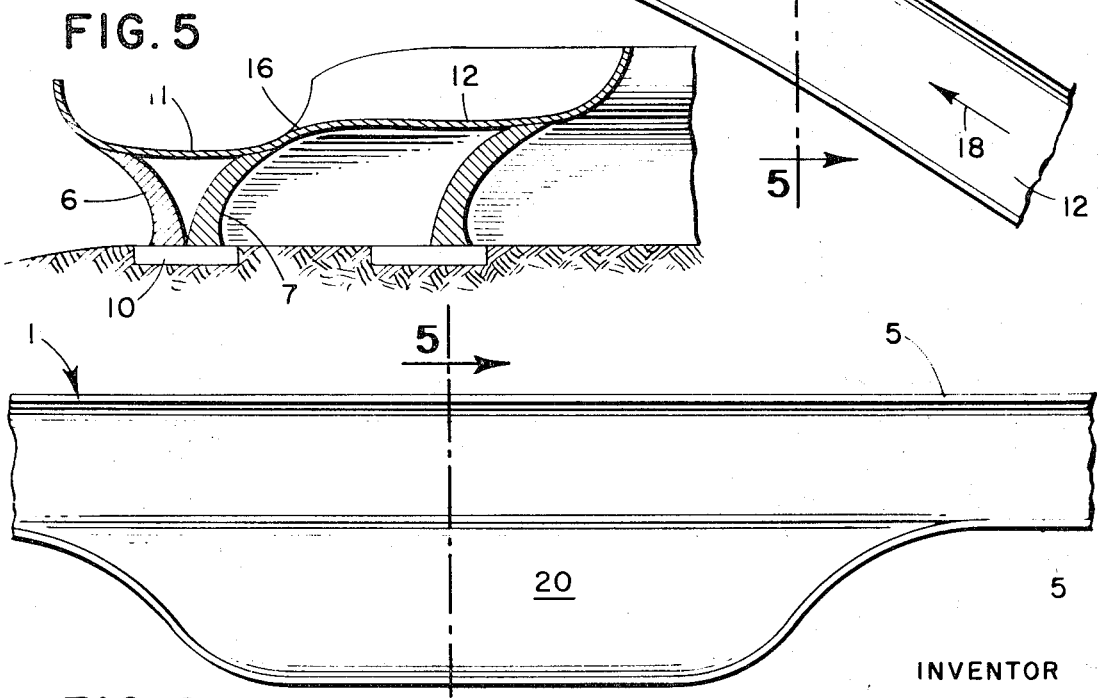
INVENTOR
PIERRE MARCEL BOUTHORS
BY
Stevens, Davis, Miller & Mosher
ATTORNEYS

United States Patent Office 3,540,068
Patented Nov. 17, 1970

3,540,068
TRAFFIC SYSTEMS OF VEHICLES
Pierre Marcel Bouthors, 1 Square des Ormes,
Marly-le-Roy, Yvelines, France
Filed May 31, 1967, Ser. No. 642,506
Claims priority, application France, June 7, 1966,
64,389
Int. Cl. E01c *1/00;* E01d *1/00*
U.S. Cl. 14—1                    1 Claim

ABSTRACT OF THE DISCLOSURE

Traffic lane system for automotive vehicles circulating in single file on a track of which the concave cross-sectional contour is adapted automatically to guide the vehicles, wherein said track and the cooperating longitudinal elements supporting same are assembled to constitute a beam of sufficient rigidity having but spaced bearing points for engaging the underlying ground, said track being adapted to constitute the base of a closed tubular structure.

---

This invention relates to a traffic lane system for automotive vehicles which permits a regular traffic flow while guiding the vehicles without requiring any steering maneuver from the drivers. This system is moderate in cost and requires but little ground surface.

The present invention consists of a specific construction of a lane structure system wherein the vehicles move in single file, each lane comprising a concave track supported by longitudinal cooperative members and being designed for a specific type of vehicles having a same cruising speed and guided automatically without any intervention of the drivers, the track of this lane system and the longitudinal members supporting same being so assembled as to constitute a beam having a rigidity sufficient to require only relatively spaced bearings on the underlying ground.

According to another feature characterising this invention the upper, track-forming portion of this structure consists of the base of a tubular closed structure.

A typical form of embodiment of this invention will now be described by way of example with reference to the diagrammatic drawing attached hereto, in which:

FIG. 3 is a side elevation of the structure as seen in FIG. 1;

FIG. 4 is a plan view of an outlet junction;

FIG. 5 is a cross-section taken along the line 5—5 of both FIGS. 4 and 6; and

FIG. 6 is the plan view of a track section with emergency side bypass or parking area.

Figure 1:
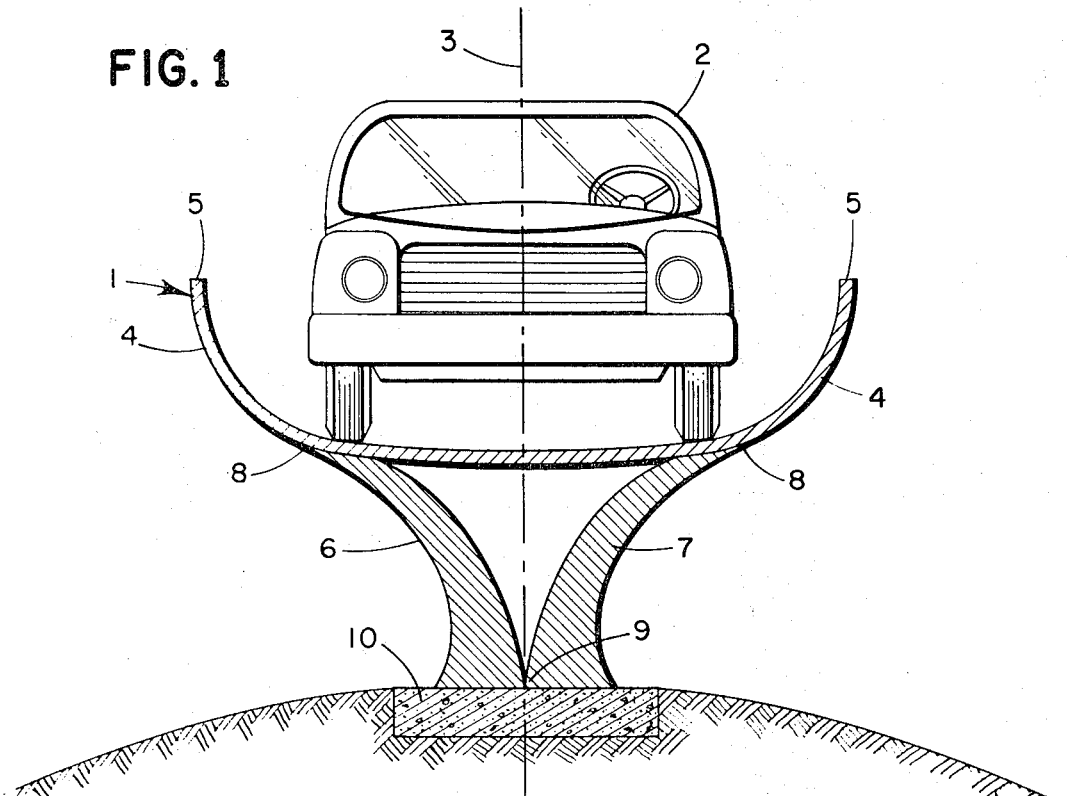
FIG. 1 illustrates in cross-sectional view of traffic lane structure constructed according to the teachings of this invention, in the case of a rectilinear track section.

In FIG. 1 it will be seen that the track 1 is trough-shaped with gradually inclined sides so that if the vehicle 2 departs from a normal central position in which it is coincident with the track axis 3 the shape of the marginal portions 4 will act like a canted curve so as to urge the vehicle towards the axis 3 of the trough, without requiring any steering maneuver by the driver. The top edge or railing 5 of marginal portion 4 is also shaped to prevent the vehicle 2 from running off the track in case of faulty maneuver.

In the form of embodiment illustrated in the drawing the track 1 is supported by two symmetrical continuous surface elements 6 and 7 assembled along lines 8 with the track proper, said surface elements 6 and 7 being assembled with each other along their common base 9 to constitute in conjunction with the track a rigid beam bearing at spaced intervals on supports 10 disposed upon the ground.

Along straight lane sections the axis 3 is vertical.

Figure 2:
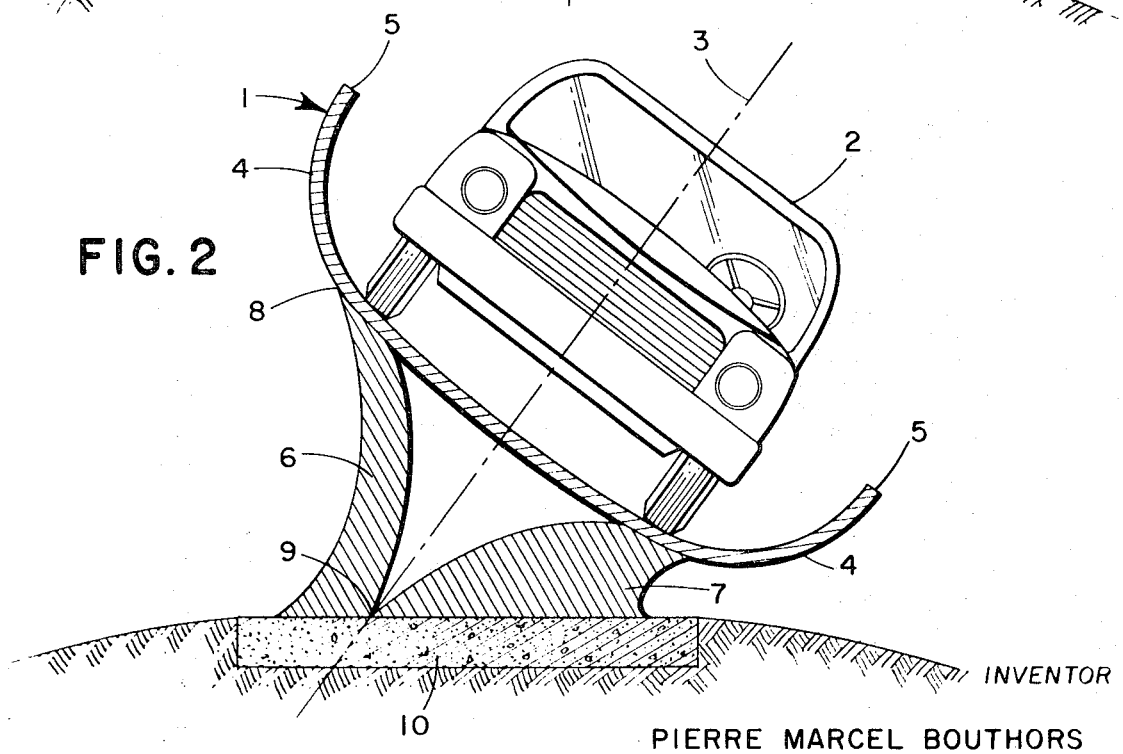
FIG. 2 is a cross-sectional view of a curve section.

In curves (FIG. 2) this axis 3 is inclined to the angle necessary to cause the vehicle to follow automatically the track curvature at the prescribed traffic speed.

FIGS. 4 and 5 illustrate a typical form of embodiment of a road junction wherein a vehicle from track section 11 will automatically follow the course in the direction 14 towards section 13 if the driver does not steer his vehicle, but if after a point 15 he turns the steering wheel to the right the vehicle will be switched to track section 12, this steering movement being sufficient to cause the vehicle to clear the rise 16 and take the secondary lane 12. The inlet to traffic lanes is obtained in the same, simple manner; thus, a vehicle moving from section 13 in the direction 17 can take track 11, like a vehicle from 12 in the direction 18.

FIG. 6 shows the construction of a bypass or parking place 20, a plurality of these places being provided at spaced intervals on one or both sides of the main track; the cross-sectional contour along the line AB is the same as in FIG. 5.

This arrangement also permits the construction of parking areas as large as desired.

From the constructional point of view, the surface elements 1, 6 and 7 of the tracks according to the present invention may consist of steel plates assembled by using suitable fastening methods and elements. If desired reinforced concrete or plastic, or even wood may be used in this construction. According to the type of construction contemplated, the supporting plates 10 may be spaced more or less from each other, as shown for example in FIG. 3.

As clearly shown in this figure the necessary ground surface consists simply of the surface area of the supporting plates 10.

In order to increase the rigidity of the beam constituting the track according to this invention, so that the supports may be disposed at greater mutual intervals and that obstacles of greater width can be cleared, the upper portion of the track-forming structure may have a closed tubular cross-sectional contour. The track thus obtained may act as a bridge and protect the vehicle against various external actions (strong wind areas, stone-slides and avalanches, etc.).

This track may also be constructed as a floating road or even an immersed road for crossing stretches of water such as rivers, ponds, etc.

The track system according to this invention is operated as follows:

On a same lane the cruising speed of the vehicles is set at a uniform value which may be higher for passenger vehicle lanes and lower for lanes intended for trucks and buses, it being understood that each lane will be constructed with due consideration for the maximum total weight of the vehicles to be admitted thereon.

Along each lane the selected traffic speed may be either simply signalled to the drivers who must adhere thereto, or imposed by a synchronized traffic light system comprising signal lights disposed at suitable intervals and set to operate at the selected cruising speed according to the well-known "green-wave" principle. At long as a vehicle follows the prescribed course at the prescribed speed the driver of this vehicle will be relieved of all steering cares, his only duty consisting in observing the prescribed cruising speed and the proper spacing with the preceding vehicle. However, when the driver wishes to take a branch road (FIGS. 4 and 5) or stop in a bypass or parking area (FIG. 6) he shall steer his vehicle accordingly. In principle, any overtaking is precluded. However, overtaking may be contemplated in certain well-defined areas or sections having for example a general design of the type illustrated in FIG. 6, but having of course a length sufficient to permit safe overtakings.

Similarly, a track system according to this invention and constructed on the proper scale may also be contemplated for miniature automobile circuits or the like.

Although the present invention has been described in conjunction with preferred embodiments, it is to be understood that modifications and variations may be practiced.

What I claim as new is:

1. A traffic lane system in association with automotive vehicles for automatically guiding in single file said vehicles without steering action of the drivers, except when the drivers wish to take a branch road or stop in parkings adjacent to the traffic lane, comprising a continuous trough-shaped track having curved wheel bearing surfaces, said track being concave having a cross-section which comprises a first radius of curvature which cooperates with the wheels of said vehicles under weight and inertia forces to maintain said vehicles near the center of the track and a second radius of curvature substantially shorter than said first radius of curvature to prevent said vehicles from leaving the track in case of faulty maneuver, and a plurality of support elements fixed to and spaced along said track, each said support element comprising two symmetrical continuous surface elements joined together at a common base and fixed to said track symmetrically with respect to the longitudinal axis of said track.

References Cited

UNITED STATES PATENTS

| | | | |
|---|---|---|---|
| 3,096,728 | 7/1963 | Amann et al. | 104—134 |
| 3,330,221 | 7/1967 | Trillo | 104—134 |
| 3,343,793 | 9/1967 | Waser | 104—134 |
| 3,373,697 | 3/1968 | Hartje | 104—23 |
| 2,574,067 | 11/1951 | Seidman | 238—100 |
| 3,353,498 | 11/1967 | Davis | 104—123 |

FOREIGN PATENTS

| | | |
|---|---|---|
| 728,393 | 4/1932 | France. |

ARTHUR L. LA POINT, Primary Examiner

R. A. BERTSCH, Assistant Examiner

U.S. Cl. X.R.

46—202; 94—1; 104—124, 134; 193—1; 238—1; 272—56.5